G. STARKE.
INNER TUBE PROTECTOR.
APPLICATION FILED OCT. 12, 1915.
1,220,568.
Patented Mar. 27, 1917.
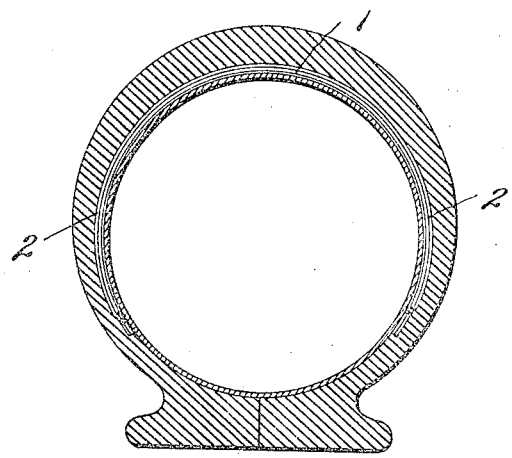
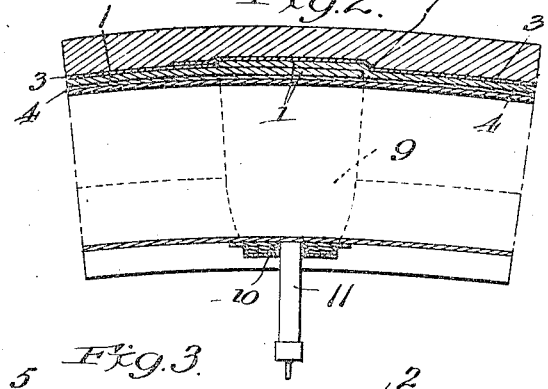
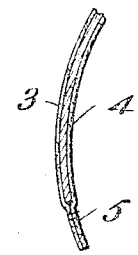
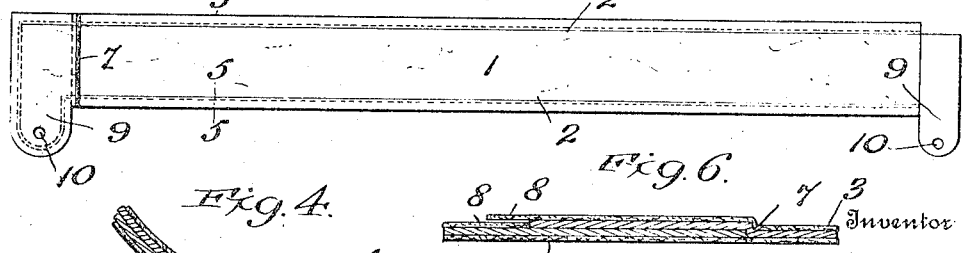
Witnesses
A. V. Doyle.
James R. Koehl
Inventor
G. Starke,
By Victor J. Evans
Attorney

UNITED STATES PATENT OFFICE.

GUSTAVE STARKE, OF NEW YORK, N. Y.

INNER-TUBE PROTECTOR.

1,220,568.   Specification of Letters Patent.   Patented Mar. 27, 1917.

Application filed October 12, 1915. Serial No. 55,513.

*To all whom it may concern:*

Be it known that I, GUSTAVE STARKE, a citizen of the United States, residing at New York, in the county of Bronx and State of New York, have invented new and useful Improvements in Inner-Tube Protectors, of which the following is a specification.

This invention relates to inner tube protectors for pneumatic tires and has for its primary object the provision of a device of this character which will positively protect the tube against puncture due to contact of the tire with foreign objects or penetrating substances from the outside or upon the roadway.

Another object of this invention resides in the provision of a device of this character which will adapt itself to the shoe of an ordinary tire structure without necessarily any changes in the construction thereof.

A still further object of this invention resides in the provision of an inner tube protector, which, while serving to resist any tendency of foreign objects wholly penetrating the shoe and entering the tube, will also be of a character which will not affect the natural buoyancy of the tire or its inherent qualities.

A still further object of the invention resides in the provision of an inner tube protector which will freely adapt itself to the various shocks and jars which are imparted to the tire structure, while maintaining a position at all times between the shoe and tube which will be necessary to the office of the protector as a guard against the penetration of the tube by foreign objects.

Another and essential object of the invention is to provide a resilient protector formed of a single piece of sheet steel adapted to be inserted between the shoe and tube and means for holding the same against creeping around the tire and for also preventing any undue chafing of the tube and shoe, yet allowing for a slight relative separation of the ends of the protector to cause the same to be fully responsive to heat changes and thereby rendered free for slight contraction and expansion of the metal.

In the drawings forming a part of this specification and in which like parts indicate similar parts throughout the several views:—

Figure 1 is a transverse section through a pneumatic tire illustrating the application of the invention thereto.

Fig. 2 is a longitudinal section through the same illustrating the means for holding the protector against creeping around the tire.

Fig. 3 is a plan view of the protector.

Fig. 4 is a transverse section through the overlapping ends of the protector.

Fig. 5 is a section on the line 5—5 of Fig. 3.

Fig. 6 is a longitudinal section through the overlapping ends of the protector.

In carrying the invention into practice, the principal points of advantages of the invention lie particularly in the simplicity of construction of the protector; its lightness in weight; its inherent yielding qualities to permit of its being fully responsive to all of the common shocks and jars which are transmitted to the body of the tire structure while the wheel is in motion, and these points, with other essentials are productive of a device, which when applied to the tire will not in any way add objectional weight thereto nor take therefrom any of its buoyancy or elasticity. Another and especial feature in the invention which I am desirous of properly emphasizing is the adaptability of the device to pneumatic tires of ordinary construction without necessitating changes in the form thereof.

The device consists of a single piece of sheet steel of uniform thickness throughout, and approximately of the same uniform width from end to end. The metal is curved in transverse section as shown in Fig. 1 so as to conform with the contour of the tire body, in and around the space between the tread portion and adjacent sides of the shoe and inner tube. Therefore the device is said to include a central body portion 1 and connecting side walls 2, the latter being extended to points near the attaching flanges of the casing or shoe so as to fully protect the sides of the inner tube against injury by foreign objects which may penetrate the sides of the shoe. The protector extends around the inner tube for the full circumference thereof and the main body 1 of the protector effectually serves to protect the tube against any foreign objects which might penetrate the active tread section of said shoe or casing.

In order to prevent chafing of the tube and its casing it is preferred that the protector be inclosed in a fabric casing consisting of separate layers of canvas 3 and 4 respectively disposed at the opposite sides of the protector. These pieces of canvas are brought together along the longitudinal sides of the protector and they are secured to one another as at 5 in any suitable well known manner, such as the stitching shown in Figs. 3 and 5, or they may be cemented together. The protector has one of its ends stepped or offset as at 7 and it overlaps the next adjacent free end of the protector in order that the joint between the ends of the protector will be flush and the entire inner surface of the protector rendered substantially continuous or without any appreciable interruption. This is necessary in order to prevent injurious pinching of the inner tube. At the overlapping ends of the protector the canvas sheets 3 and 4 are extended in the form of extending flaps which overlap each other as shown in Fig. 6.

With a view to preventing creeping of the protector around the inner tube so as to avoid undue friction between the parts, I provide lugs 9—9 which are disposed along the same longitudinal edge of the protector but located respectively at the opposite ends thereof. These lugs are thus designed to overlap one another as shown in Fig. 4 and they are provided with registering passages 10 which are adapted to receive the valve stem 11 which extends in the usual manner from the inner tube. The diameter of each of the passages 10 is slightly greater than the diameter of the valve stem so as to permit the protector to respectively contract and expand when subjected to ordinary heat changes. As stated the lugs are disposed only on one side of the protector and as consequence thereof it is evident that the overlapping ends are free to be flexed and to also adapt themselves to the tire at the time of the application of sudden shocks and jars which are applied to the tire while in motion.

It now follows, as a result of the above, that means are provided herein for effectually protecting the inner tube against puncture by foreign objects or substances which may accidentally be introduced to the shoe or casing while the wheel is in motion. The protector may be expeditiously applied to or removed from the tire as the occasion may demand, and when applied, it is found that it does not add materially to the weight of the tire, nor does it tend to take from the same any of its desired yielding properties.

What is claimed as new is:—

An inner tube protector for pneumatic tires, comprising, a resilient metallic member, interposed between the shoe and inner tube and provided respectively at the opposite ends with lugs extending from the same side of the member and extending under the inner tube and overlapping one another and adapted to receive the valve stem, as and for the purpose specified and co-acting therewith to hold the protector against creeping, the said opposite side of the protector, laterally of the lugs, being free for flexing movements.

In testimony whereof I, affix my signature in presence of two witnesses.

GUSTAVE STARKE.

Witnesses:
ANNA V. DOYLE,
GEO. A. BYRNE.